US011874884B2

(12) United States Patent
Walters et al.

(10) Patent No.: US 11,874,884 B2
(45) Date of Patent: Jan. 16, 2024

(54) IDENTIFYING WEB ELEMENTS BASED ON USER BROWSING ACTIVITY AND MACHINE LEARNING

(71) Applicant: Capital One Services, LLC, McLean, VA (US)

(72) Inventors: Austin Walters, Savoy, IL (US); Jeremy Goodsitt, Champaign, IL (US); Vincent Pham, Seattle, WA (US); Mark Watson, Urbana, IL (US); Fardin Abdi Taghi Abad, Champaign, IL (US); Reza Farivar, Champaign, IL (US); Anh Truong, Champaign, IL (US); Kenneth Taylor, Marrero, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/741,756

(22) Filed: May 11, 2022

(65) Prior Publication Data

US 2022/0269736 A1    Aug. 25, 2022

Related U.S. Application Data

(63) Continuation of application No. 16/388,793, filed on Apr. 18, 2019, now Pat. No. 11,372,934.

(51) Int. Cl.
| | |
|---|---|
| *G06F 16/951* | (2019.01) |
| *G06N 3/08* | (2023.01) |
| *G06F 11/34* | (2006.01) |
| *G06N 20/00* | (2019.01) |

(52) U.S. Cl.
CPC ........ *G06F 16/951* (2019.01); *G06F 11/3438* (2013.01); *G06N 3/08* (2013.01); *G06N 20/00* (2019.01)

(58) Field of Classification Search
CPC ..... G06F 16/951; G06F 11/3438; G06N 3/08; G06N 20/00
USPC ...................... 707/709; 706/12, 45
See application file for complete search history.

(56) References Cited

U.S. PATENT DOCUMENTS

| | | |
|---|---|---|
| 8,655,913 B1 | 2/2014 | Shah et al. |
| 2010/0281009 A1 | 11/2010 | Wen et al. |
| 2012/0198056 A1 | 8/2012 | Shama et al. |
| 2012/0209987 A1 | 8/2012 | Rhinelander et al. |
| 2013/0332398 A1* | 12/2013 | Wu ........................ G06N 20/00 706/12 |
| 2015/0046216 A1* | 2/2015 | Adjaoute ........... G06Q 30/0201 705/7.29 |

(Continued)

*Primary Examiner* — Phong H Nguyen
(74) *Attorney, Agent, or Firm* — Greenberg Traurig, LLP (57) ABSTRACT

A computer-implemented method includes tracking, by a computing device, user browsing activity of a first page having known elements; mapping, by the computing device, the user browsing activity to the known elements; storing, by the computing device, mapping information that maps the user browsing activity to the known elements; tracking, by the computing device, user browsing activity of a second page having unknown elements; identifying, by the computing device, the unknown elements based on the mapping information and the user browsing activity of the second page; and executing, by the computing device, one or more computer-based instructions based on the determining the unknown elements that were identified.

20 Claims, 7 Drawing Sheets

(56) References Cited

U.S. PATENT DOCUMENTS

| | | |
|---|---|---|
| 2015/0339213 A1 | 11/2015 | Lee et al. |
| 2016/0307201 A1* | 10/2016 | Turgeman ............. G06F 21/316 |
| 2018/0039530 A1* | 2/2018 | Ciabarra, Jr. ....... G06F 11/0709 |
| 2018/0046792 A1* | 2/2018 | Toqan .................... G06V 40/70 |
| 2018/0107689 A1* | 4/2018 | Grossman ............. G06F 16/951 |
| 2018/0121470 A1* | 5/2018 | Grossman ............... G06F 16/95 |
| 2018/0137560 A1 | 5/2018 | Chopra et al. |
| 2019/0014184 A1 | 1/2019 | Yavilevich et al. |
| 2019/0149626 A1 | 5/2019 | Shah et al. |
| 2020/0327444 A1 | 10/2020 | Negi et al. |

* cited by examiner

IDENTIFYING WEB ELEMENTS BASED ON USER BROWSING ACTIVITY AND MACHINE LEARNING

BACKGROUND

A web element may refer to an object on a webpage or web-based application. For example, a web element may include a link, an image, a text object, a multimedia object, a field, or the like. Website testing techniques may be based on the types, quantities, and arrangements of web elements.

SUMMARY

In one example aspect, a computer-implemented method includes tracking, by a computing device, user browsing activity of a first page having known elements; mapping, by the computing device, the user browsing activity to the known elements; storing, by the computing device, mapping information that maps the user browsing activity to the known elements; tracking, by the computing device, user browsing activity of a second page having unknown elements; identifying, by the computing device, the unknown elements based on the mapping information and the user browsing activity of the second page; and executing, by the computing device, one or more computer-based instructions based on the determining the unknown elements.

In one example aspect, a computer program product includes a computer readable storage medium having program instructions embodied therewith, the program instructions executable by a computing device to cause the computing device to perform operations comprising tracking user browsing activity of a first page having known elements; training a classifier by mapping the user browsing activity to the known elements; storing the classifier that was trained; tracking user browsing activity of a second page having unknown elements; identifying the unknown elements using the stored classifier and the user browsing activity of the second page; and executing a computer-based instruction based on the determining the unknown elements.

In one example aspect, a non-transitory computer-readable medium storing instructions, that, when executed by at least one processor of a computing system, cause the computing system to perform operations, the operations including tracking a plurality of sets of user browsing activity of a first page having known elements; mapping a combination of the plurality of sets of user browsing activity to the known elements; storing mapping information that maps the combination of the plurality of sets of the user browsing activity to the known elements; tracking user browsing activity of a second page having unknown elements; identifying the unknown elements based on the mapping information and the user browsing activity of the second page; executing one or more computer-based instruction based on the unknown elements that were identified, wherein the one or more computer-based instructions include an instruction to generate a custom test for the second page based on the unknown elements.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Web testing migration (e.g., for testing a new web page or application) may include the migration and/or verification of proper functionality of user login techniques (e.g., Single Sign-On (SSO)). Additionally, or alternatively, web testing migration may include a verification that the web page is presented in accordance with a particular design (e.g., that the web page is presented with a particular style, logo, background color/image, color scheme, layout scheme, etc.). Migrating web testing (e.g., for testing a new web page or application) may involve the unique identification of web elements. Such identification can be time consuming, cumbersome, inaccurate, etc. Accordingly, aspects of the present disclosure streamline the identification of web elements by using user activity/flow data and machine learning. More specifically, aspects of the present disclosure may implement machine learning to train a classifier that maps user browsing activity to web elements. This classifier in turn, is used to identify web elements (e.g., from a new web page or application) based on the user browsing activity of the web page or application. In this way, the identification of web elements is streamlined and improved.

In some implementations, aspects of the present disclosure may determine or generate custom tests to apply to the new web page based on the identified web elements. For example, a particular custom test used in the past on web pages having a similar set of web elements as those present in a new web page may be used (e.g., with modifications as necessary to accommodate discrepancies between the new web page and previous pages with similar elements).

Aspects of the present disclosure may improve the field of website and/or web-based application testing through the use of rules/criteria. For example, custom testing may be generated based on criteria that defines testing parameters based on the presence of web elements and/or their attributes. As such, using one or more techniques corresponding to aspects of the present disclosure, it is possible for computing systems to automatically identify web elements from a web page/we b-based application through the monitoring of associated user activity, which was not previously possible. Additionally, or alternatively, aspects of the present disclosure improve the functioning of computer systems by reducing memory requirements, processing requirements, and/or network resource consumption. For example, by creating custom tests based on identified web elements, the execution of extraneous/redundant tests is avoided, thus reducing the consumption of processing resources, memory resources, network resources, and/or other computing resources. Further, aspects of the present disclosure may track and analyze hundreds of thousands or potentially millions of data points representing user activity, which cannot be done with pen and paper, or using the human mind.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

Figure 1A:
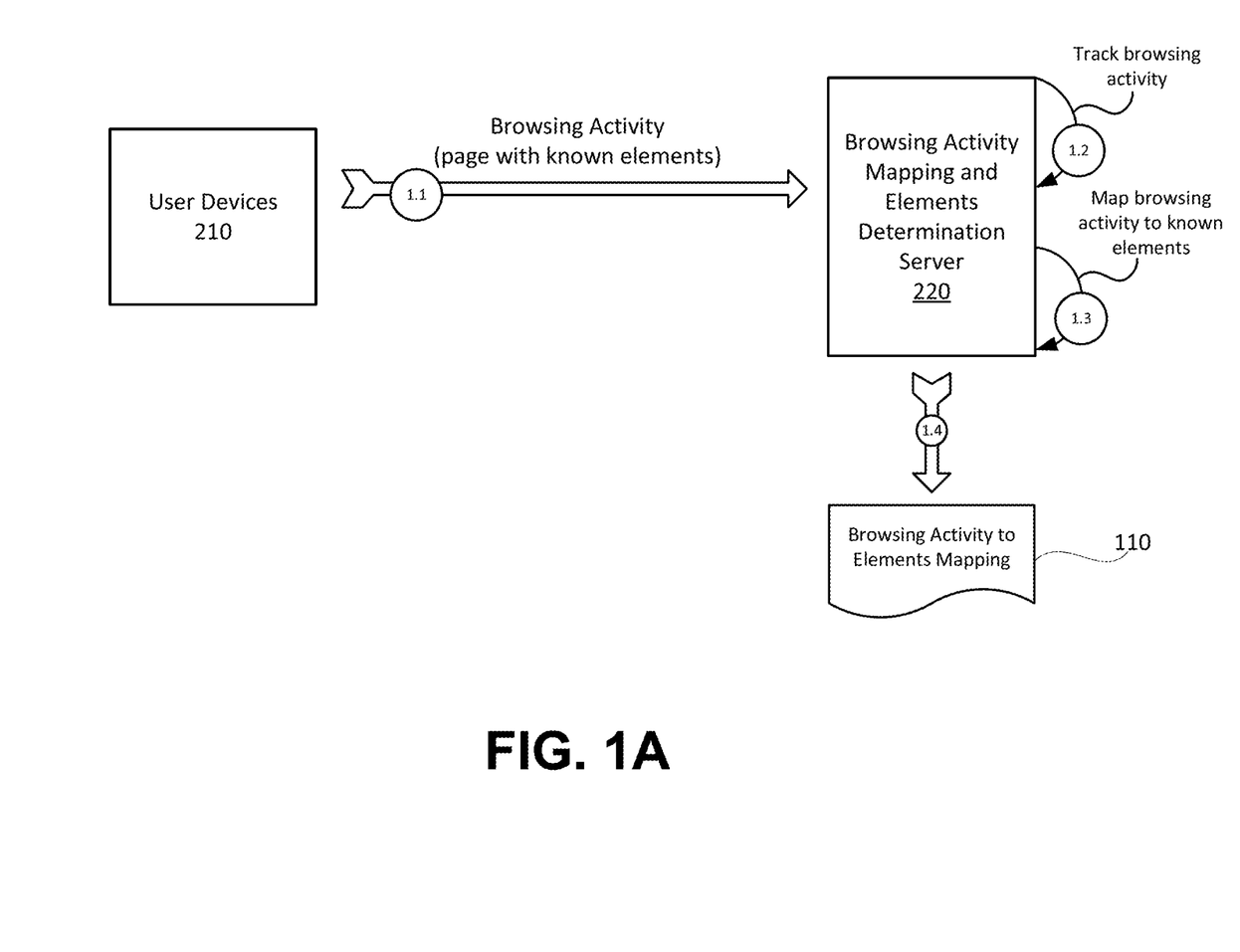
FIG. 1A shows the first part of an overview of an example of an implementation in accordance with aspects of the present disclosure.
Figure 1B:
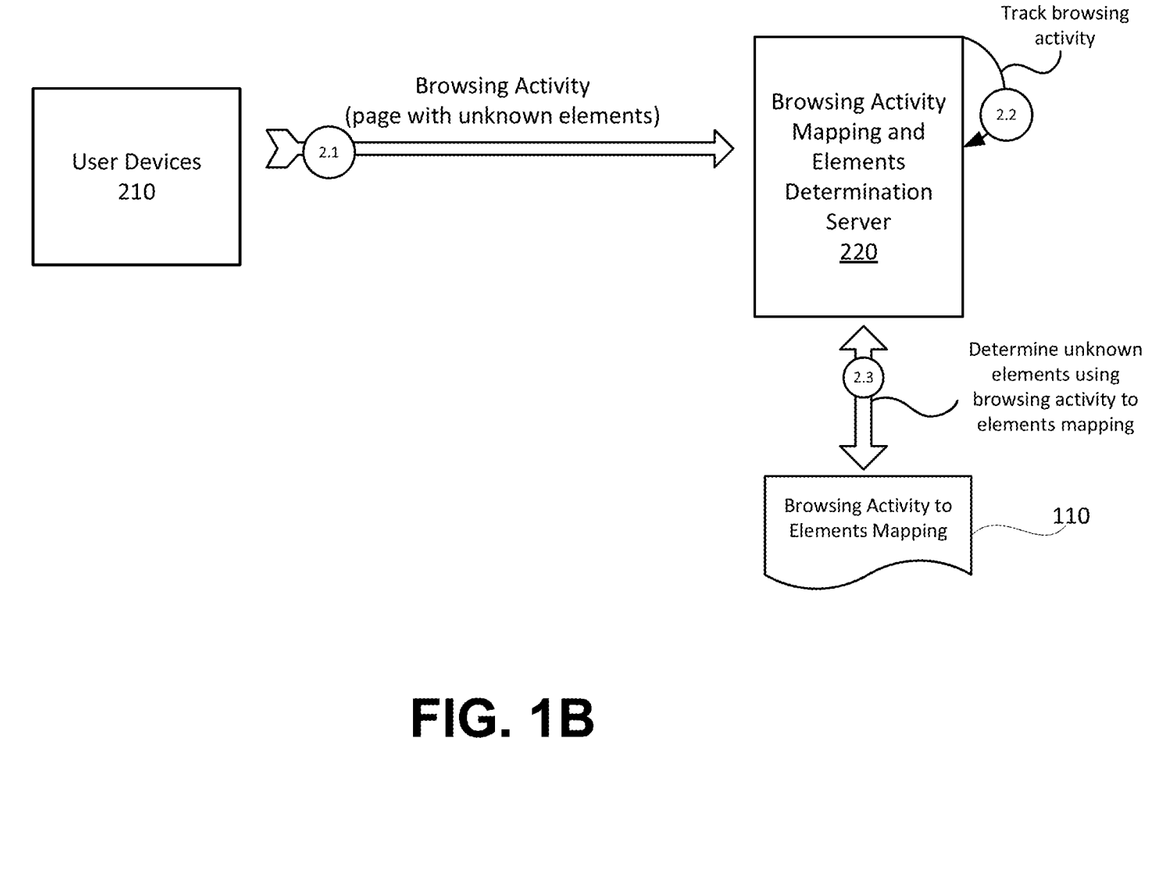
FIG. 1B shows the second part of an overview of an example of an implementation in accordance with aspects of the present disclosure.

FIGS. 1A and 1B show an overview of an example of an implementation in accordance with aspects of the present disclosure. More specifically, FIG. 1A illustrates a training procedure in which a classifier is trained to map user browsing activity to web elements. As shown in FIG. 1A, this implementation includes a server 220 that performs browsing activity mapping and elements determination, and which monitors user browsing activity from one or mom user devices 210 (at operations or steps 1.1 and 1.2), such as laptop computers, tablet computers, smartphones, and the like. In some implementations, the browsing activity mapping and elements determination server 220 tracks or monitors browsing activity on a web page (or application) in which the web elements are known (e.g., are previously labelled or identified by an operator). That is, the known web elements may serve as the "truths" in a process that trains a classifier. The browsing activity mapping and elements determination server 220 further pairs, associates, links, or maps the tracked browsing activity to the known elements (step 1.3) and generates a browsing activity to elements mapping object 110 (at step 1.4). In some implementations, the mapping object may be a trained classifier, a data structure, and/or other type of object that maps the browsing activity to the known elements. In some implementations, the browsing activity mapping and elements determination server 220 saves the browsing activity to elements mapping object 110 for use in classifying unknown elements based on browsing activity associated with the unknown elements. In some implementations, the process from FIG. 1A may be repeated to refine and update the classifier and mappings 110.

FIG. 1B illustrates an example of an implementation for identifying unknown elements based on user browsing activity. At step 2.1, one or more user devices 210 may browse a web page or application having unknown elements (e.g., a new target web page whose elements may need to be determined, e.g., for generating a custom testing procedure for the new web page). At step 2.2, the browsing activity mapping and elements determination server 220 may track or monitor the browsing activity of the user devices 210; i.e., of the users employing the user devices 210. At step 2.3, the browsing activity mapping and elements determination server 220 may access the browsing activity to elements mapping 110 to categorize, classify, identify, or otherwise determine the unknown elements present in the target web page by matching or correlating the browsing activity that was tracked to the same or similar browsing activity that was recorded in the mapping object 110 in step 1.4. Based on finding or identifying the same or similar browsing activity saved in the mapping object 110 at step 1.1, the server 220 can categorize, classify, or otherwise determine that the target web page includes a web element(s) that is similar to, the same as, or the same type as, a specific web element(s) that is stored in the mapping object 110 in association with the saved browsing activity from step 1.1. In this way the browsing activity mapping and elements determination server 220 may determine what unknown web elements are based on their browsing activity and without the need for a human operator to manually determine or identify the unknown elements. As described herein, once the unknown elements are determined, an appropriate testing procedure may be identified, migrated, and/or used, based on previous tests or testing procedures that were used for similar pages having a similar set of elements.

Figure 2:
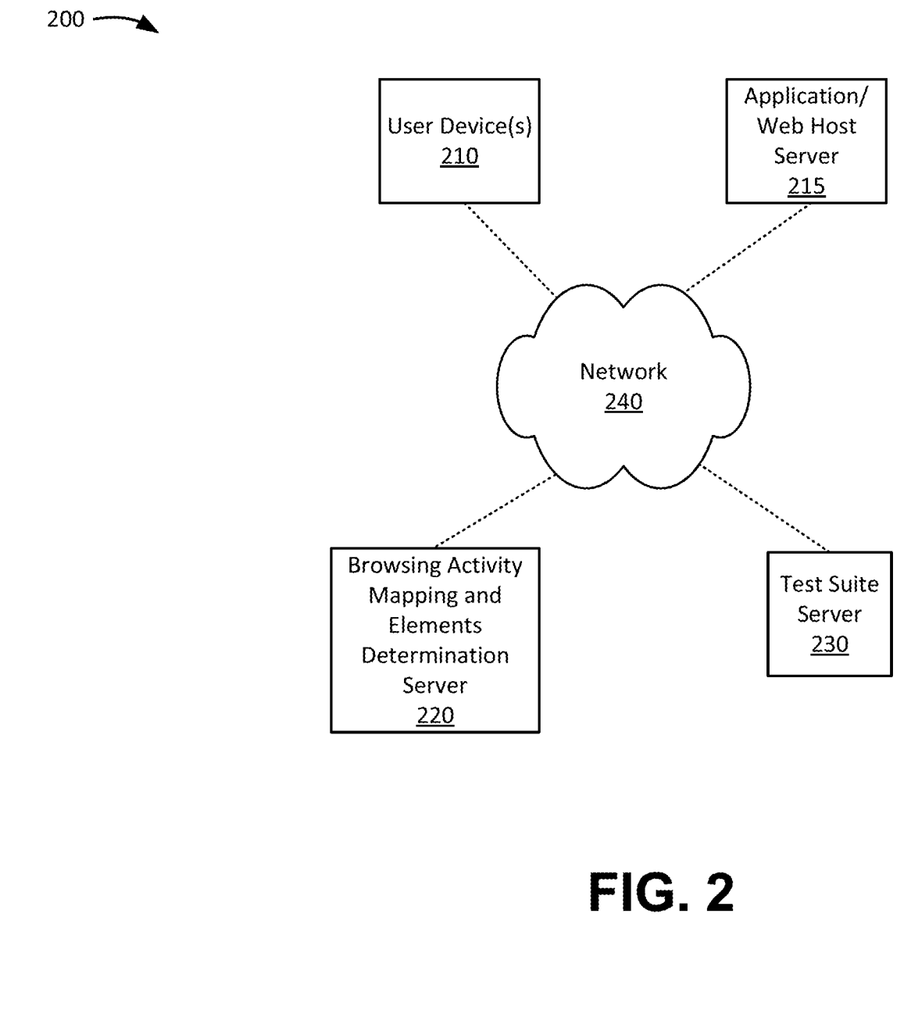
FIG. 2 shows an example of an environment as described herein.

FIG. 2 shows an example of an environment in accordance with aspects of the present disclosure. As shown in FIG. 2, environment 200 includes one or more user devices 210, an application/web host server 215, a browsing activity mapping and elements determination server 220, a test suite server 230, and a network 240. In the implementation shown, the user devices 210, the application/web host server 215, the browsing activity mapping and elements determination server 220, and the test suite server 230 are operably and communicatively connected via the network 240

The user device(s) 210 may include a computing device(s) capable of communicating via a network, such as the network 240. In examples of embodiments, the user device 210 corresponds to a mobile communication device (e.g., a smart phone or a personal digital assistant (PDA)), a portable computer device (e.g., a laptop or a tablet computer), a desktop computer, and/or another type of computing device. In some embodiments, the user device 210 may communicate with the application/web host server 215 to access and browse a web page and/or application hosted by the application/web host server 215.

The application/web host server 215 may include one or more computing device that hosts a webpage and/or a web-based application having one or more webpages. As described herein, the application/web host server 215 may host a webpage whose elements are not yet known and may be determined based on user browsing activity via the user device 210 as described herein.

The browsing activity mapping and elements determination server 220 may include one or more computing devices, and may train a classifier that maps browsing activity to web elements. As described herein, the browsing activity mapping and elements determination server 220 may use the trained classifier to identify, classify, or determine web elements (e.g., of a web page or application whose elements are unknown). In some implementations, the browsing activity mapping and elements determination server 220 may train the classifier using supervised or unsupervised machine learning and/or other suitable techniques.

The test suite server 230 may include one or more computing devices and may execute tests on one or more webpages or applications hosted by the application/web host server 215. Examples of the tests include the migration and/or verification of proper functionality of user login techniques (e.g., Single Sign-On (SSO)). Additionally, or alternatively, web testing migration may include a verification that the web page is presented in accordance with a particular design (e.g., that the web page is presented with a particular style, logo, background color/image, color scheme, layout scheme, etc.). In some implementations, the test suite server 230 may store information identifying the testing parameters used to test webpages and applications having a specified or given set of web elements.

In some implementations, the test suite server 230 may generate a custom test for a webpage or application. The custom test may include testing parameters that are based on the identified web elements of a webpage or application (e.g., from step 2.3 of FIG. 1B), and based on information stored by the test suite server 230 identifying the testing parameters of webpages and applications having web elements that are the same as or similar to those of the webpage or application to be tested. Thus, in such implementations, the system creates a test for the webpage or application, where the test is customized to perform operations to check, appraise, or evaluate the quality, performance, efficiency, reliability, etc. of elements in the webpage or application according to the identity of those elements as determined by the browsing activity mapping and elements determination server 220.

The network 240 may include one or more networks and associated network devices/components. Additionally. or alternatively, the network 240 may include one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity and interconnections of devices and/or networks in the environment 200 is not limited to what is shown in FIG. 2. In practice, the environment 200 may include additional devices and/or networks; fewer devices and/or networks; different devices and/or networks; or differently arranged devices and/or networks than are illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
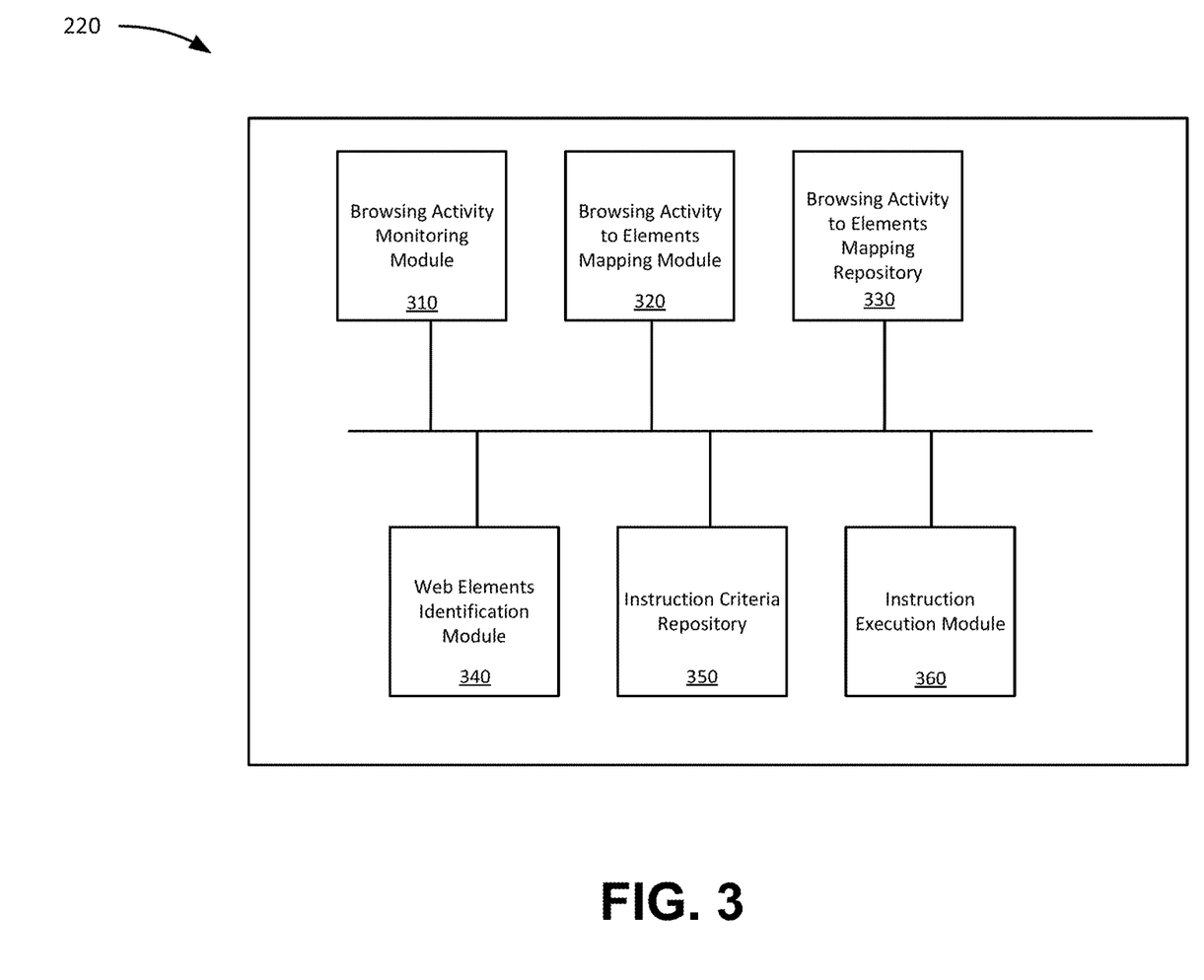
FIG. 3 illustrates examples of the functional components of a server for browsing activity mapping and elements determination as described herein.

FIG. 3 illustrates an example of the functional components of a browsing activity mapping and elements determination server 220 as described herein. As shown in FIG. 3, the browsing activity mapping and elements determination server 220 may include a browsing activity monitoring module 310, a browsing activity to elements mapping module 320, a browsing activity to elements mapping repository 330, a web elements identification module 340, an instruction criteria repository 350, and an instruction execution module 360. In various embodiments, the browsing activity mapping and elements determination server 220 may include additional or fewer components than those shown in FIG. 3. In some embodiments, separate components may be integrated into a single computing component or module. Additionally, or alternatively, a single component may be implemented as multiple computing components or modules.

The browsing activity monitoring module 310 may include one or more program module (e.g., a set of processor-executable instructions, computer code, etc.) that monitors or tracks (e.g., records data representing) the browsing activity performed on a webpage (e.g., as presented by a browser and/or a web-based application) by the users operating the user devices 210. In some implementations, the browsing activity monitoring module 310 may monitor the browsing activity as part of a classifier training process (e.g., as at 1.1 of FIG. 1A). Additionally, or alternatively, the browsing activity monitoring module 310 may monitor the browsing activity as part of a web elements identification process. (e.g., as at 2.1 of FIG. 1B). As described herein, the browsing activity may include keystrokes, mouse movements and clicks, page/object/image/text selections, page scrolling, zooming activity, browser type, geographic location of the user, page viewing duration, and/or any other variety of activities and browsing-related information, which may be represented using web analytics metadata.

The browsing activity to elements mapping module 320 may include one or more program module that maps browsing activity to web elements. More specifically, the browsing activity to elements mapping module 320 may obtain monitored or tracked browsing activity (e.g., from the browsing activity monitoring module 310) and map that browsing activity to a specific web element(s) a webpage having known elements.

For example, as described previously, the browsing activity to elements mapping module 320 may perform a training processes in which user browsing activity is tracked for a webpage whose elements are known, and that user browsing activity is mapped to or associated with one or more of the known web elements. The resulting set of data (e.g., the mapping data 110 of FIG. 1) may thus represent the correspondence between the browsing activity and the known elements for a webpage having a given set of web elements or a webpage having a certain use. In some implementations, the attributes of the web elements may be determined (e.g., known or predetermined via identification by an operator or from the code of the known elements) as well such that the browsing activity maps to or is associated with the attributes of the web elements as well as to the web elements themselves. In various implementations, attributes may include, for example, the type of web element (e.g., image, video, audio object, text box, text field, link, animation, button, etc.). Additionally, or alternatively, the attributes may include a size/shape of the element, the location on the webpage where the element is placed, and/or other characteristic of the web element.

In some implementations, the browsing activity to elements mapping module 320 may repeat the training process for a specific webpage(s) (e.g., a training webpage) having known elements by using the input from multiple users/user devices 210. For example, the browsing activity to elements mapping module 320 may obtain multiple sets of user browsing activity for the training webpage with known elements to more accurately train a classifier, which learns from the multiple sets of user browsing activity to map or associate certain browsing activities with specific web elements and/or specific web element attributes. That is, the browsing activity to elements mapping module 320 may map a given set of user browsing activity data to a given set of web elements. In general, the more training data that is obtained, the more accurate the classifier becomes. In some implementations, the browsing activity to elements mapping nodule 320 may use machine teaming techniques to train a classifier by mapping the browsing activity to the web elements and to the attributes of the web elements (e.g., the type of web element, metadata associated with the web element, etc.). In some implementations, training the classifier may involve inputting the user browsing activity into a neural network, which becomes or acts as the classifier after it learns to associate specific browsing activities with specific web elements.

The browsing activity to elements mapping repository 330 may include one or more data storage system that stores the mapping information (e.g., the browsing activity to elements mapping 110). As described herein, the mapping information may include the trained classifier, a data structure, and/or other information that maps the browsing activity data to the web elements. In the implementation shown, the classifier and/or mapping information may be obtained from or supplied by the mapping module 320. In some implementations, the browsing activity to elements mapping repository 330 stores the trained classifier, which in some implementations, includes information that maps the browsing activity to web elements. In some implementations, the browsing activity to elements mapping repository 330 further stores attributes of the web elements (e.g., which may be predetermined by a developer and/or from code of the web elements). As described herein, the classifier may be used to identify unknown elements from a target webpage or application based on browsing activity.

The web elements identification module 340 may include one or more program module that identifies unknown elements from a target webpage or application. More specifically, the web elements identification module 340 may obtain user browsing activity for the target webpage or application (e.g., tracking data from, the browsing activity monitoring module 310), access the browsing activity to elements mapping information (e.g., the trained classifier stored by the browsing activity to elements mapping repository 330), and identify, recognize or otherwise determine the unknown elements by mapping the target-webpage browsing activity using the mapping information. As an example, the web elements identification module 340 may obtain sets of user target-webpage browsing activity, and identify a set of web elements (e.g., from the browsing activity to elements mapping repository 330) that correspond to the target-webpage's user browsing activity. In this way, the web elements identification module 340 may classify or identify the web elements (e.g., objects, forms, etc.) that are present in the target webpage or application based on the target-webpage browsing activity. In some implementations, the web elements identification module 340 may also identify attributes of the web elements from the classifier and mapper stored by the browsing activity to elements mapping repository 330.

In various embodiments, the mapping information (and more specifically, the trained classifier) may be used to implement, at least partially, the functionality of the web elements identification module 340. After the classifier is trained, (e.g. by the mapping module 320) the web elements identification module 340 may obtain the monitored/tracked browsing activity data for the target webpage having unknown elements and provide that data to the trained classifier, which classifies or identifies the web elements of the target webpage.

The instruction criteria repository 350 may include a data storage system that stores data that identifies instruction(s) to execute for various web element(s). The instruction-identifying data may be stored in association with specific web element(s), such that the instruction-identifying data can be looked up, retrieved, or accessed using or based on the web elements, for example, based on the web elements that have been identified in the target webpage or application by the identification module 340. In some implementations, the instruction criteria repository 350 may store a data structure identifying a set of testing instructions and a corresponding set of web elements to which the testing instructions apply. In some implementations, the instruction-identifying data may include custom testing parameters for testing a webpage or application. As described herein, the custom testing parameters may be based on testing parameters previously used to test webpages having the same or similar sets of web elements and web element attributes (e.g., based on information stored by the test suite server 230). In some implementations, the instruction criteria repository 350 may store a data structure identifying a set of testing parameters and a corresponding set of web elements having a given set of attributes.

The instruction execution module 360 may include one or more program modules that executes instructions related to a target webpage or application, e.g., instructions for testing the target webpage or application. In some implementations, the instruction execution module 360 may execute instructions in accordance with the instruction-identifying data stored by the instruction criteria repository 350. More specifically, the instruction execution module 360 may analyze the web elements identified by the identification module 340, look up or access the instruction-identifying data (e.g., a set of testing parameters) for those web elements from the instruction criteria repository 350, and execute an instruction that corresponds to the looked-up instruction-identifying data. For example, the instruction may cause the server 220 to generate and/or execute a test on the target webpage, where the test has a set of custom testing parameters that are based on the set of web elements identified for the target webpage by the web elements identification module 340.

Figure 4:
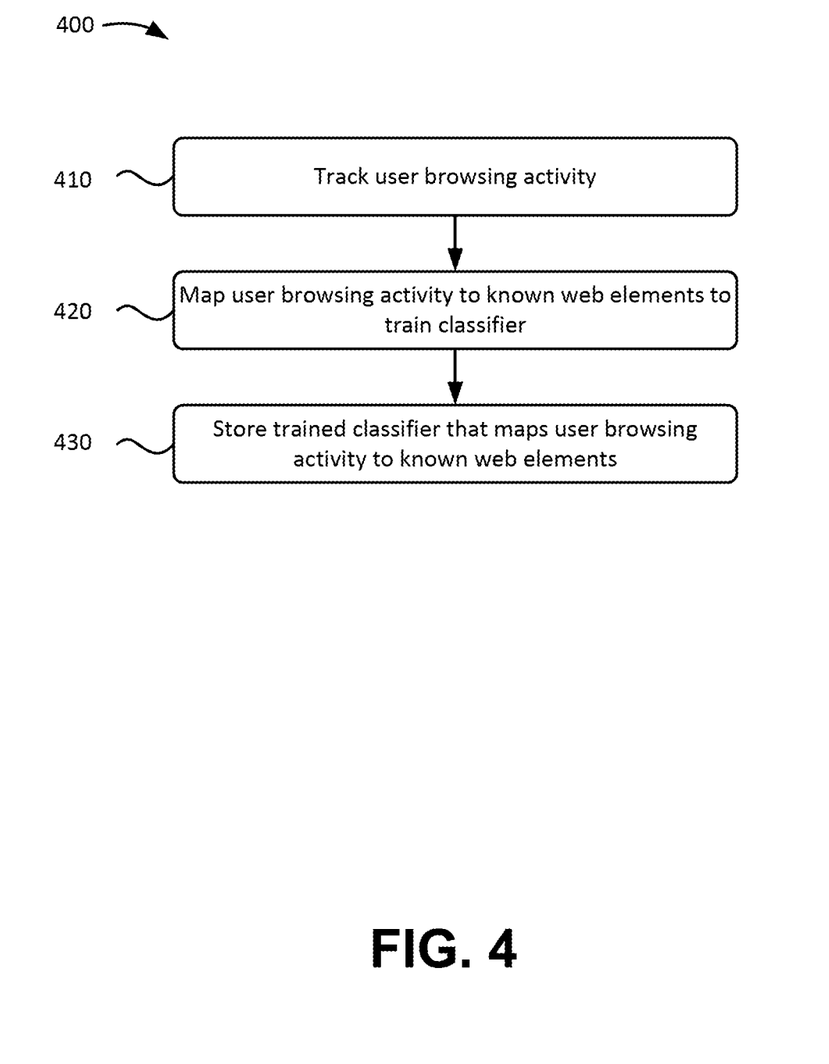
FIG. 4 shows an example of a flowchart of a process for training a classifier that maps user browsing activity to web elements.

FIG. 4 shows an example of a flowchart of a process 400 for training a classifier that, maps, correlates, or associates user browsing activity to web elements. The steps of FIG. 4 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 4, the process 400 may include tracking, monitoring, or recording user browsing activity (block 410). For example, as described above with respect to the browsing activity monitoring module 310, the browsing activity mapping and elements determination server 220 may track user browsing activity of or in a webpage (e.g., within a browser or hosted via an application) in which the web elements are known. A webpage in which the elements are known may be referred to as a training webpage.

Process 400 also includes mapping the user browsing activity to the known elements to train a classifier (block 420). For example, as described above with respect to the browsing activity to elements mapping module 320, the browsing activity mapping and elements determination server 220 may map the browsing activity (e.g., from block 410) to the known elements (and their attributes) as part of training a classifier using supervised learning. In various implementations, the classifier learns a function that maps a browsing-activity input, (which is a set or vector of one or more browsing activities), to a web-element output, (which is a set of one or more known elements), based on examples of input-output pairs. In some implementations, process blocks 410 and 420 may be repeated in order to improve the classifier (e.g., the learned mapping function) with additional supervised-learning data sets of user browsing activity data.

Process 400 further includes storing the trained classifier that maps the user browsing activity to the known elements (step 430). For example, as described above with respect to the browsing activity to elements mapping repository 330, the browsing activity mapping and elements determination server 220 may store the trained classifier in the browsing activity to elements mapping repository 330. As described herein, the trained classifier may be used to identify or classify web elements from a target webpage or application based on user browsing activities performed on the target webpage or application.

Figure 5:
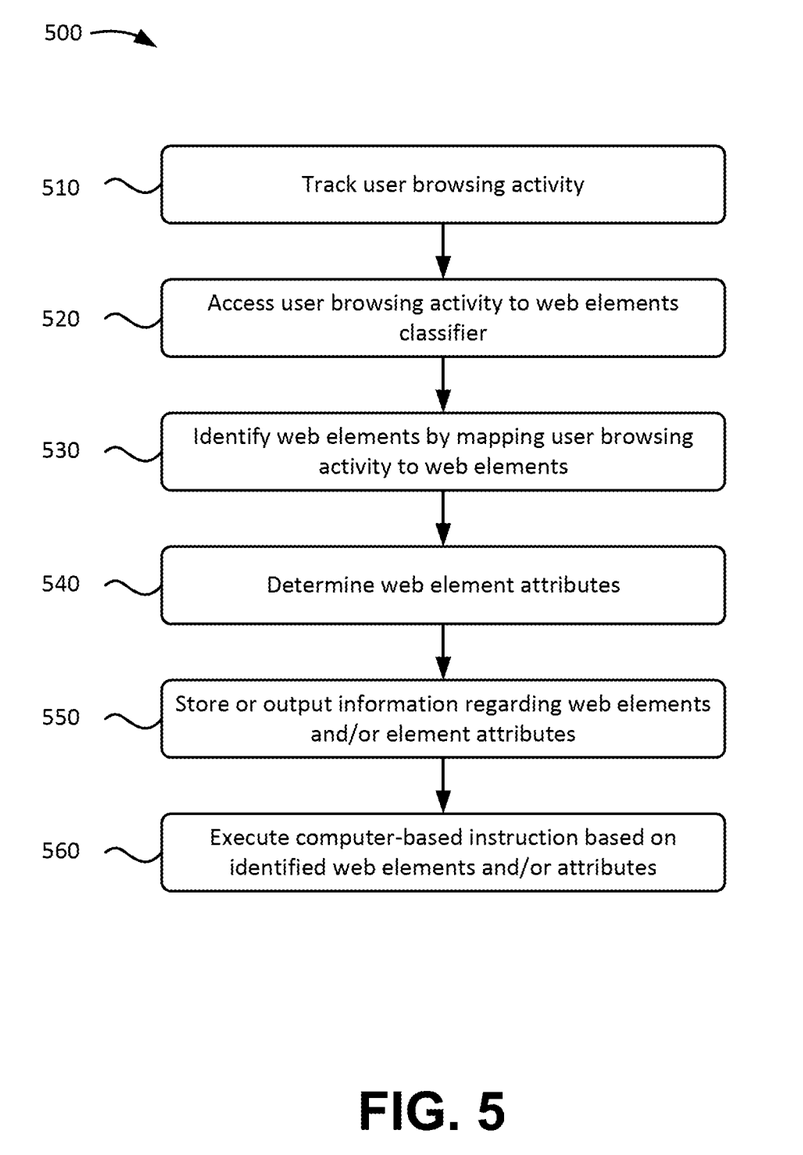
FIG. 5 shows an example of a flowchart of a process for identifying web elements from a target webpage or application.

FIG. 5 shows an example of a flowchart of a process for identifying web elements from a target webpage or application, for example, using a trained classifier. The steps of FIG. 5 may be implemented in the environment of FIG. 2, for example, and are described using reference numbers of elements depicted in FIG. 2. As noted above, the flowchart illustrates the architecture, functionality, and operation of possible implementations of systems, methods, and computer program products according to various embodiments of the present invention.

As shown in FIG. 5, process 500 may include tracking user browsing activity (block 510). For example, as described above with respect to the browsing activity monitoring module 310, the browsing activity mapping and elements determination server 220 may track, monitor, and/or record user browsing activity for a target webpage or application whose web elements are not known.

Process 500 may further include accessing or using a classifier that takes a set of user browsing activities as an input (e.g., an input vector) and produces a web element(s) as an output (block 520). For example, as described above with respect to the web elements identification module 340, the browsing activity mapping and elements determination server 220 may access the user browsing to web elements classifier (e.g., stored by the browsing activity to elements mapping repository 330 and trained by the process 400).

Process 500 may also include identifying web elements by mapping the user browsing activity to web elements using the classifier (block 530). For example, as described above with respect to the web elements identification module 340, the browsing activity mapping and elements determination server 220 may identify or classify the web elements in the target webpage or application by mapping the user browsing activity to the web elements (e.g., using the classifier). In some implementations, the browsing activity mapping and elements determination server 220 may obtain a threshold amount of user browsing activity data before classifying the user browsing activity data to web elements (e.g., to improve the accuracy of the classification in which the accuracy of classification is generally proportional to the amount of user browsing activity data). As an illustrative example, the mapping and elements determination server 220 may obtain fifty to hundred or more sets of user browsing activity data and may smoothen out the data browsing activity (e.g., by averaging the data, generating data regressions, discarding outliers, etc.). In some implementations, mapping and elements determination server 220 may identify the web elements by mapping the smoothened user browsing activity data to the web elements.

Process 500 may further include determining attributes of the web elements that were identified (block 540). For example, as described above with respect to the web elements identification module 340, the browsing activity mapping and elements determination server 220 may determine the attributes of the web elements based on a mapping between the identified web elements and the attributes of those web elements.

Process 500 may also include storing or outputting information regarding the web elements and/or the element attributes (step 550). For example, the browsing activity mapping and elements determination server 220 may store or output information regarding the newly identified web elements for the target webpage/application. In some implementations, the information regarding identified web elements may be used to generate a custom test for the target webpage/application. Additionally, or alternatively, the information regarding identified web elements may be used for some other purpose (e.g., to optimize the target webpage by adjusting the arrangement of the web elements, removing one or more of the web elements, adding additional elements, etc.).

Process 500 may further include executing a computer-based instruction based on the identified web elements and/or the attributes. For example, as described above with respect to the instruction execution module 360, the browsing activity mapping and elements determination server 220 may executes instructions e.g., for generating a custom a test for a target webpage or application. In some implementations, the browsing activity mapping and elements determination server 220 may execute instructions in accordance with the criteria or information stored by the instruction criteria repository 350. More specifically, the browsing activity mapping and elements determination server 220 may execute an instruction to generate and/or execute a test that has a set of custom testing parameters that are based on, and designed to ascertain the quality and performance of, the set of web elements in the target webpage as identified by the web elements identification module 340. In some implementations, the browsing activity mapping and elements determination server 220 may communicate with the test suite server 230 to execute the custom test on the target webpage or application.

Figure 6:
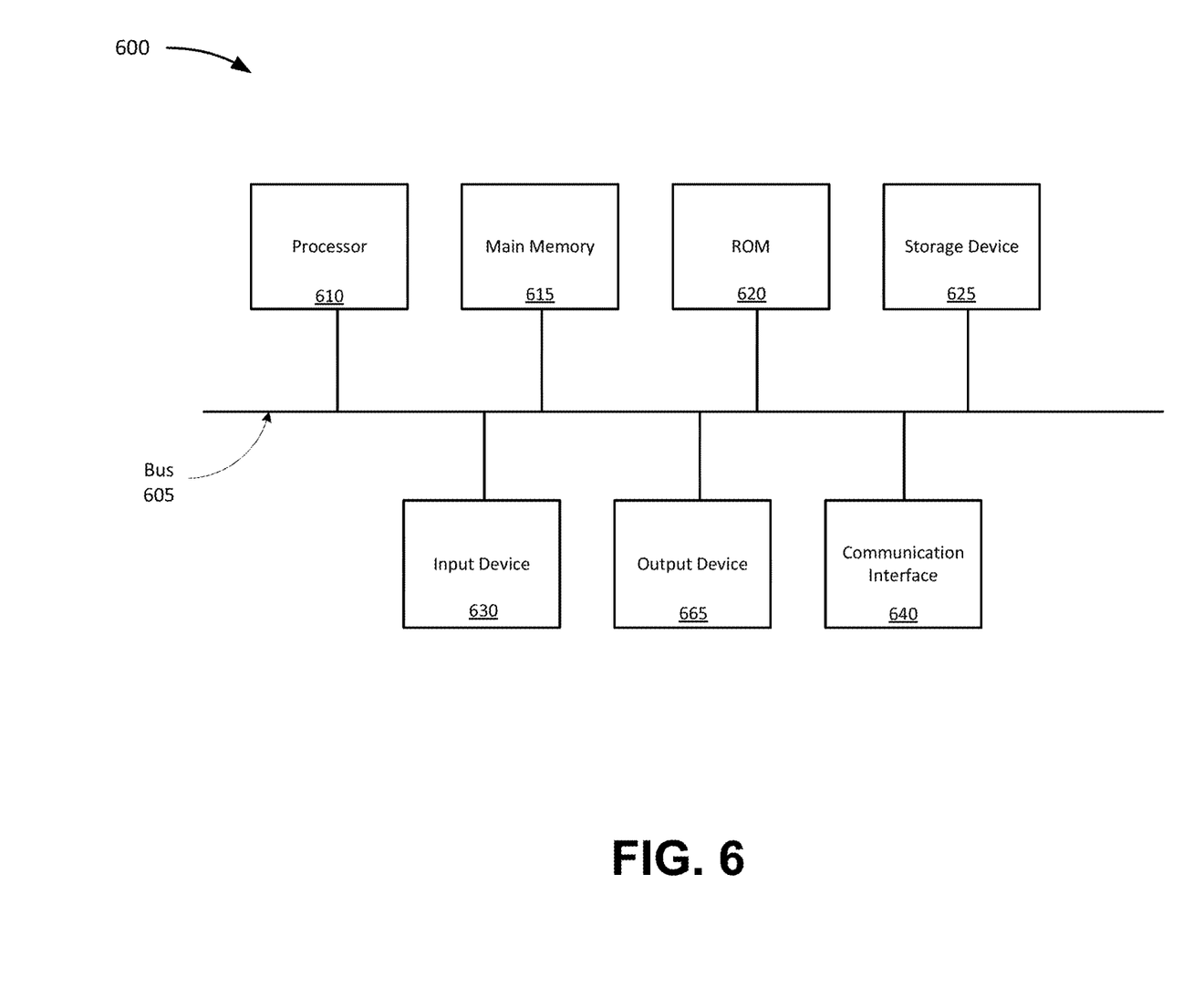
FIG. 6 illustrates an example of the components of a device that may be used within the environment of FIG. 2.

FIG. 6 illustrates examples of components of a device 600 that may be used within environment 200 of FIG. 2. The device 600, or multiple devices 600, may correspond to the user device 210, the application/web host server 215, the browsing activity mapping and elements determination server 220, and/or the test suite server 230. Each of the user device 210, the application/web host server 215, the browsing activity mapping and elements determination server 220, and/or the test suite server 230 may include one or more devices 600 and/or one or more components of device 600.

As shown in FIG. 6, the device 600 may include a bus 605, a processor 610, a main memory 615, a read only memory (ROM) 620, a storage device 625, an input device 660, an output device 665, and a communication interface 640.

Bus 605 may include a path that permits communication among the components of device 600. Processor 610 may include one or more of a processor, a microprocessor, an application specific integrated circuit (ASIC), a field programmable gate array (FPGA), or another type of processor that interprets and executes instructions. Main memory 615 may include a random access memory (RAM) or another type of dynamic storage device that stores information or instructions for execution by the processor 610. ROM 620 may include a ROM device or another type of static storage device that stores static information or instructions for use by processor 610. Storage device 625 may include a magnetic storage medium, such as a hard disk drive, a solid state memory, and/or a removable memory, such as a flash memory.

Input device 660 may include one or more component that permits an operator to input information to device 600, such as a control button, a keyboard, a keypad, or another type of input device. Output device 665 may include one or more component that outputs information to the operator, such as a light emitting diode (LED), a display, or another type of output device. Communication interface 640 may include any transceiver-like component that enables device 600 to communicate with other devices or networks. In some implementations, communication interface 640 may include a wireless interface, a wired interface, or a combination of a wireless interface and a wired interface. In embodiments, communication interface 640 may receiver computer readable program instructions from a network and may forward the computer readable program instructions for storage in a computer readable storage medium (e.g., storage device 625).

Device 600 may perform certain operations, functions or steps, as described herein. Device 600 may perform these operations in response to processor 610 executing instructions contained in a computer-readable medium, such as main memory 615. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The instructions may be software instructions that are read into main memory 615 from another computer-readable medium, such as storage device 625, or from another device via communication interface 640. The software instructions contained in main memory 615 may direct processor 610 to perform the processes that are described hemin. Alternatively, hardwired circuitry may be used in place of or in combination with software instructions to implement processes described herein. Thus, implementations described herein are not limited to any specific combination of hardware circuitry and software.

In some implementations, device 600 may include additional components, fewer components, different components, or differently arranged components than are shown in FIG.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts/operations specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur in a different order than that noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or mot customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-implemented method comprising:
   training, by a computing device, a browser activity mapping machine learning classifier of a mapping data model to recognize web elements from historical user browsing activity based at least in part on a mapping of the historical user browsing activity to at least one known web element so as to produce a trained mapping data model;
   tracking, by the computing device, user browsing activity of a user on a webpage having at least one unknown web element;
      wherein the user browsing activity comprises at least one user input on the webpage;
      wherein the at least one user input is provided via a user computing device associated with the user;
   inputting, by the computing device, the user browsing activity into a browser activity mapping machine learning classifier of a trained mapping data model to output an identification of at least one identified web element mapped to the at least one unknown web element, the at least one identified web element being correlated with the user browsing activity;
   generating, by the computing device, at least one custom test for the webpage based at least in part on the at least one identified web element;
      wherein the at least one custom test comprises one or more computer-based instructions configured to perform at least one operation with the webpage to test at least one of a quality, performance, efficiency, reliability, or operation of the at least one identified web element; and
   triggering, by the computing device, the at least one custom test to be performed on the webpage by executing the one or more computer-based instructions so as to determine whether to modify the webpage.

2. The method of claim 1, further comprising:
   utilizing, by the computing device, the browser activity mapping machine learning classifier to identify at least one web element attribute of the at least one identified web element; and
      wherein the at least one identified web element comprises at least one known web element attribute.

3. The method of claim 2, further comprising:
   determining, by the computing device, at least one testing parameter based at least in part on the at least one web element attribute; and
   generating, by the computing device, the at least one custom test based at least in part on the at least one testing parameter.

4. The method of claim 2, wherein the at least one web element attribute includes at least one of:
   a type;
   a size;
   a shape; or
   a page placement location.

5. The method of claim 1, further comprising:
   utilizing, by the computing device, the browser activity mapping machine learning classifier to identify at least one type associated with the at least one identified web element; and
   generating, by the computing device, the at least one custom test based at least in part on at least one type.

6. The method of claim 1, wherein the custom test is based on information stored by a test suite server.

7. The method of claim 1, wherein the user browsing activity includes at least one from the group consisting of:
   a mouse movement;
   a cursor movement;
   a cursor hover;
   a mouse click;
   a keystroke;
   a page selection;
   a page scrolling;
   a page zooming;
   a page viewing duration;
   a page text;
   a browser type; and
   a geographic location.

8. The method of claim 1, wherein the browser activity mapping machine learning classifier includes at least one selected from the group consisting of:
training a classifier; and
inputting the user browsing activity into a neural network.

9. The method of claim 1, wherein the user browsing activity comprises at least one browsing activity input.

10. The method of claim 9, further comprising:
tracking, by the computing device, the user browsing activity on the webpage having the at least one known web element;
mapping, by the computing device, the at least one browsing activity input to the at least one known web elements based at least in part on the user browsing activity at the user computing device to the at least one known element; and
retraining, by the computing device, the browser activity mapping machine learning classifier to recognize the web elements from the user browsing activity based at least in part on the mapping of the at least one browsing activity input to the at least one known web element.

11. A system comprising:
at least one processor configured to execute software instructions, wherein the software instructions, upon execution, cause the at least one processor to:
train a browser activity mapping machine learning classifier of a mapping data model to recognize web elements from historical user browsing activity based at least in part on a mapping of the historical user browsing activity to at least one known web element so as to produce a trained mapping data model;
track user browsing activity of a user on a webpage having at least one unknown web element;
wherein the user browsing activity comprises at least one user input on the webpage;
wherein the at least one user input is provided via a user computing device associated with the user;
input the user browsing activity into a browser activity mapping machine learning classifier of a trained mapping data model to output an identification of at least one identified web element mapped to the at least one unknown web element, the at least one identified web element being that is correlated with the user browsing activity;
generate at least one custom test for the webpage based at least in part on the at least one identified web element;
wherein the at least one custom test i-s comprises one or more computer-based instructions configured to perform at least one operation with the webpage to test at least one of a quality, performance, efficiency, reliability, or operation of the at least one identified web element; and
trigger the at least one custom test to be performed on the webpage by executing the one or more computer-based instructions so as to determine whether to modify the webpage.

12. The system of claim 11, wherein the at least one processor is further configured to execute the software instructions that, upon execution, further cause the at least one processor to:
utilize the browser activity mapping machine learning classifier to identify at least one web element attribute of the at least one identified web element; and
wherein the at least one identified web element comprises at least one known web element attribute.

13. The system of claim 12, wherein the at least one processor is further configured to execute the software instructions that, upon execution, further cause the at least one processor to:
determine at least one testing parameter based at least in part on the at least one web element attribute; and
generate the at least one custom test based at least in part on the at least one testing parameter.

14. The system of claim 12, wherein the at least one web element attribute includes at least one of:
a type;
a size;
a shape; or
a page placement location.

15. The system of claim 11, wherein the at least one processor is further configured to execute the software instructions that, upon execution, further cause the at least one processor to:
utilize the browser activity mapping machine learning classifier to identify at least one type associated with the at least one identified web element; and
generate the at least one custom test based at least in part on at least one type.

16. The system of claim 11, wherein the custom test is based on information stored by a test suite server.

17. The system of claim 11, wherein the user browsing activity includes at least one from the group consisting of:
a mouse movement;
a cursor movement;
a cursor hover;
a mouse click;
a keystroke;
a page selection;
a page scrolling;
a page zooming;
a page viewing duration;
a page text;
a browser type; and
a geographic location.

18. The system of claim 11, wherein the browser activity mapping machine learning classifier includes at least one selected from the group consisting of:
training a classifier; and
inputting the user browsing activity into a neural network.

19. The system of claim 11, wherein the user browsing activity comprises at least one browsing activity input.

20. The system of claim 19, wherein the at least one processor is further configured to execute the software instructions that, upon execution, further cause the at least one processor to:
track the user browsing activity on the webpage having at least one known web element;
map the at least one browsing activity input to the at least one known web elements based at least in part on the user browsing activity at the user computing device to the at least one known element; and
train the machine learning classifier to recognize web elements from the user browsing activity based at least in part on the mapping of the at least one browsing activity input to the at least one known web element.

* * * * *